United States Patent [19]

Christensen

[11] Patent Number: 4,885,848
[45] Date of Patent: Dec. 12, 1989

[54] FLUID BED DRYER AND A BED PLATE THEREFOR

[75] Inventor: Mogens A. Christensen, Virum, Denmark

[73] Assignee: A/S Niro Atomizer, Soborg, Denmark

[21] Appl. No.: 218,554

[22] Filed: Jul. 13, 1988

[30] Foreign Application Priority Data

Jul. 14, 1987 [DK] Denmark .............................. 3666/87

[51] Int. Cl.⁴ .......................................... F26B 17/00
[52] U.S. Cl. ................................... 34/57 R; 34/57 A; 34/57 B
[58] Field of Search ................... 34/57 A, 57 B, 57 R; 209/397, 485, 486

[56] References Cited

U.S. PATENT DOCUMENTS 4,562,678 1/1986 Carroll et al.

FOREIGN PATENT DOCUMENTS

| 395603 | 5/1933 | Belgium. |
| 1561193 | 3/1969 | France. |
| 2095614 | 2/1972 | France. |
| 522392 | 12/1974 | U.S.S.R. ............................... 34/57 B |
| 847734 | 9/1960 | United Kingdom ............... 34/57 A |
| 1262791 | 2/1972 | United Kingdom. |

OTHER PUBLICATIONS

"Catalog G", Beckley Perforating Company, p. 25.

*Primary Examiner*—Henry A. Bennet
*Assistant Examiner*—John Sollecito
*Attorney, Agent, or Firm*—Dennison, Meserole, Pollack & Scheiner

[57] ABSTRACT

A fluid bed dryer comprises a bed plate having gas distributing openings in the plate. The gas distributing openings are arranged in pairs of substantially oppositely directed openings, and a depressed portion of the plate extends between the openings of each pair. Throughfall of products through such openings is substantially eliminated, and by suitably choosing the relationship of the effective area of the oppositely directed openings in the pairs of openings it is possible to obtain a desired relationship between the vertical fluidizing component and the horizontal transporting component of the upwardly directed gas flow through the openings of the bridge plate.

18 Claims, 2 Drawing Sheets

FLUID BED DRYER AND A BED PLATE THEREFOR

BACKGROUND OF THE INVENTION

1. Field of the Invention

The present invention relates to a fluid bed dryer comprising a bed plate, and a bed plate for such fluid bed dryer.

2. Description of Prior Art

Such fluid beds are used for drying and/or agglomerating particulate and powdered products, and they may be used as separate units, for example in connection with apparatus for spray drying milk products. The fluid bed unit may then be used for further drying and/or agglomerating a moist powdered or particulate material produced in a spray dryer. The bed plate of the fluid bed, which usually has a rectangular or another elongated shape, may be vibrated so as to contributed to the fluidization of the product being processed.

A fluid bed may also be combined with a spray dryer so as to form an integrated unit. A liquid product to be dried may then be sprayed into a flow of hot drying gas which is directed from the upper end of a cylindrical drying chamber towards a fluidized layer of already spray dried particles arranged at the bottom end of the drying chamber, cfr. U.S. Pat. No. 4,490,403. In a combined spray drying apparatus and fluid bed of this type the bed plate has a circular or annular shape and is normally stationarily mounted.

The gas distributing openings or perforations in the bed plate of the fluidized bed may be shaped so as to define fluidizing flows of drying gas having a flow component which is directed along the upper surface of the bed plate towards a product outlet of the fluid bed, whereby deposits of product between the openings may be avoided. The flow component directed towards the product outlet also gives rise to a self-clearing or self-emptying effect. Bed plates having such gill type gas distributing openings are well known, vide for example U.S. Pat. Nos. 3,821,342 and 4,033,555.

Plug flow of the powdered or particulate product along the bed plate may be desirable. However, gas distributing openings of the gill type may cause the lower part of the fluidized product layer to be moved in the longitudinal direction of the elongated bed plate towards the product outlet at such a speed that the upper part of the fluidized layer tends to move in the opposite direction thereby creating an undesired backmixing of the fluidized product. When the bed plate has a circular or annular shape and is mounted at the bottom end of a combined spray dryer and fluidized bed as mentioned above, the gas distributing openings of the gill type are normally arranged so as to provide a circumferentially or tangentially directed flow component. This flow component causes a rotational movement of the fluidized product layer about the central axis of the bed plate, and it has been found that product particles or agglomerates, which have been formed by the spray drying process and which are present in the fluidized product layer, tend to disintegrate, when the rotational movement caused by the gill type openings in the bed plate becomes too pronounced. It is believed that the disintegration of the particles is caused by frictional forces acting between the particles, because the rotational speed of the particles in the fluidized layer decreases with increasing distance from the bed plate.

In order to reduce the above disadvantages of a bed plate with gas distributing openings of the gill type it has been proposed to provide the bed plate with mutually parallel corrugations extending transversely to the direction of movement of the product layer along the plate as described in U.S. Pat. No. 4,305,210. Another solution which has been described in Danish Pat. No. 149,737 involves the use of a bed plate having transversely extending sections with oppositely directed gas distributing openings of the gill type, or transverse sections with circular, punched openings and openings of the gill type, respectively. These latter bed plate structures do to some extent reduce the product backmixing tendency in a fluid bed.

SUMMARY OF THE INVENTION

However, the present invention provides a fluid bed dryer comprising a bed plate of a more simple structure by means of which the movement of the fluidized product may be more accurately controlled.

Thus, the present invention provides a fluid bed dryer comprising a bed plate having a plurality of gas distributing openings defined therein, the openings of the bed plate being arranged in pairs of substantially oppositely directed openings, a depressed portion of the plate extending between the openings of each pair, and means for passing drying gas upwardly through the openings of the bed plate for fluidizing a particulate product supplied to the bed. Each depression may be shaped so that the direction, the velocity, and/or the mass flow of the gas flows directed through the pair of openings defined at opposite sides of each depression are different so as to provide a resulting combined gas flow having a fluidizing flow component extending at right angles to the upper surface of the bed plate, and a transporting flow component extending along or parallel to the upper surface of the bed plate. However, if desired, the depressions may also be shaped so that the gas flows through the oppositely directed openings provide a resulting, combined fluidizing gas flow which is directed at substantially right angles to the bed plate, and which has substantially no transporting flow component parallel to the upper surface of the bed plate.

In most cases, however, it is desired to shape at least some of the depressions and the openings formed at opposite sides thereof so as to obtain a resulting gas flow with a product transporting flow component. This may, for example, be obtained by shaping the depressions and the openings in such a manner that a pair of differently inclined, upwardly directed gas flows are obtained therethrough. In the preferred embodiment, however, the desired transporting flow component of the resulting gas flow is obtained by the effective area of one of the openings in each pair of openings exceeding that of the other, whereby different volumes of gas will flow through the oppositely directed openings per unit of time. The differently sized openings in each pair may additionally be differently directed, and a desired resulting gas flow may therefore be obtained by choosing suitable different effective areas of the gas distributing openings in each pair and/or different directions or shapes of the openings or of the adjacent edge portions of the depression.

The peripheral edges defining each gas distributing opening of the bed plate may have any suitable shape. In the preferred embodiment, however, each opening is defined by peripheral edges defining a plane extending substantially at right angles to the adjacent surface of the bed plate.

In principle, the bed plate may be made from any suitable material, and may, for example, be moulded from polymeric material. However, the bed plate is normally made from sheet metal, and the openings in each pair may then have been formed by depressing a plate portion defined between a pair of spaced slits cut in the sheet metal. The length of one of the slits in each pair may then exceed that of the other, whereby differently sized openings may be obtained. The slits of each pair may define an acute angle therebetween, and the transporting flow component of the resulting combined gas flow may then extend in the direction of a bisector of the acute angle, for example in the direction of a product outlet of the fluid bed. Preferably, the slits of each pair are substantially parallel. In that case, the transporting flow component of the resulting, combined gas flow will be directed substantially at right angles to the parallel slits.

All or most of the product transporting flow components of the gas flows through the gas distributing openings of each pair of openings may be directed in a desired direction of transportation of the fluidized product along the bed plate, for example, towards a product outlet. Alternatively, the transporting flow components of the various pairs of openings may be differently directed. Thus, said pairs of openings may be arranged in groups each comprising at least one pair of openings, the openings of each group being shaped so as to provide gas flows forming a resulting gas flow having first and second flow components extending in the plane of the bed plate (the transporting flow component) and at right angles to the plane of the bed plate (the fluidizing flow component), respectively, said first flow components of the various groups extending in substantially the same general direction. When the bed plate has an annular or circular shape, the transporting components preferably extend in the peripheral or tangential direction of the annular or circular bed plate, while the transporting components of the various groups of openings preferably extend in the longitudinal direction of the bed plate, when the bed plate has a rectangular or another elongated shape.

The present invention also relates to a bed plate for a fluid bed dryer as described above, said bed plate having a plurality of gas distributing openings formed therein, and the bed plate according to the invention is characterized in that said openings are arranged in pairs of substantially oppositely directed openings, a depressed portion of the plate extending between the openings of each pair.

The bed plate may be made from sheet metal by cutting a plurality of pairs of spaced, coextending slits in the sheet metal so as to define a sheet portion between each pair of slits and by depressing said sheet portions so as to open the slits and define oppositely directed gas distributing openings at opposite sides of each depressed sheet portion. The slits or incisions may be shaped as elongated narrow openings which are made by removing sheet metal material, or as mere cuts made without removing sheet metal material. The coextending spaced slits or incisions may define an acute angle therebetween, or may extend substantially parallelly.

The size of at least one of the openings in each pair of openings may be adjusted by passing the bed plate between a pair of spaced rollers. Thereby a uniform maximum depth of the various depressions is ensured.

BRIEF DESCRIPTION OF THE DRAWINGS

The invention will now be further described with reference to the drawings wherein.

DESCRIPTION OF PREFERRED EMBODIMENTS

Figure 1:
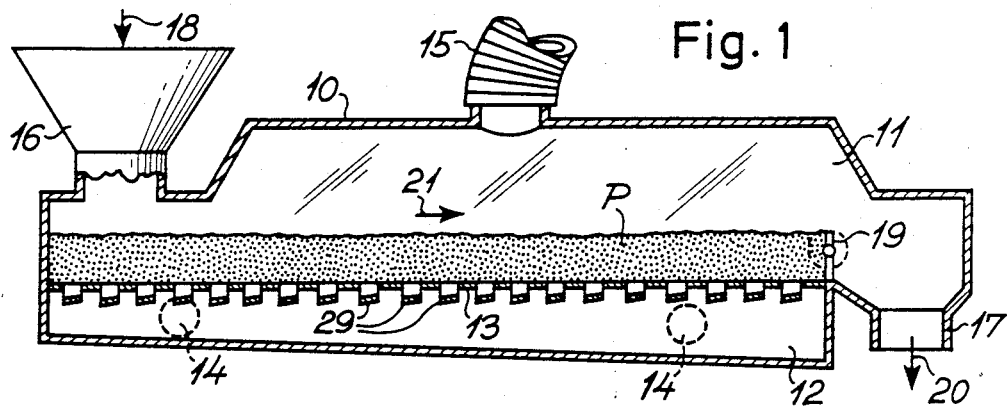
FIG. 1 is a side view and partially sectional view of a drying apparatus with a fluid bed and comprising a bed plate according to the invention.

FIG. 1 shows a fluid bed dryer which may, for example, be used for drying a partially dried and still moist powdered or particulate product, such as a milk product, or another food product. The moist product to be dried in the fluid bed dryer may, for example, have been produced by a spray drying process. The fluid bed dryer shown in FIG. 1 comprises an elongated housing 10 having an inner space divided into upper and lower chambers 11 and 12, respectively, by means of a perforated bed plate 13, which is fastened to the inner walls of the housing 10. Heated drying gas or air is supplied to the lower chamber 12 of the housing 10 through gas inlets 14, and drying gas is exhausted from the upper chamber 11 of the housing through a gas exhaust conduit 15, which may, for example, be connected to a cyclone, not shown, from which the drying gas may be exhausted into the atmosphere. At one end, the housing 10 comprises a product inlet funnel 16, which opens into the upper chamber 11 defined above the perforated bed plate 13. At the other end the housing 10 has a product outlet 17, which also communicates with the upper chamber 11.

A moist powdered or particulate product P, which may, for example, be supplied from a conventional spray drying system and which has to be further dried, may be fed continuously to the product inlet 16 of the housing 10 as indicated by an arrow 18. Heated drying gas or drying air is supplied to the lower chamber 12 of the housing, and the heated gas flows upwardly through the perforations of the bed plate and into the upper chamber 11 so as to form a plurality of gas flows fluidizing the product P on the bed plate 13. The thickness or the height of the fluidized product layer is determined by the height of a movable damper or valve member 19 forming an overflow at the outlet end of the chamber 11. When a state of equilibrium has been obtained an amount of dried product corresponding to the amount of moist product supplied through the inlet funnel 16 will flow out through the product outlet 17 as indicated by an arrow 20 in FIG. 1. Thus, when the fluid bed dryer is operating the fluidized product layer supported by the bed plate 13 is moved continuously from the inlet funnel 16 to the product outlet 17 as indicated by an arrow 21. When the operation of the fluid bed dryer has to be closed down, the supply of moist product to the inlet funnel 16 is stopped, and thereafter the damper or overflow plate 19 is moved to such a position that almost all of the product may flow from the bed plate 13 into the product outlet 17.

In order to ensure that no substantial residue of the product P remains on the bed plate when the damper 19 has been opened the perforations or gas distributing openings in the bed plate are preferably formed so as to define upwardly directed fluidizing gas flows having a horizontal flow component directed towards the product outlet 17.

Figure 3:
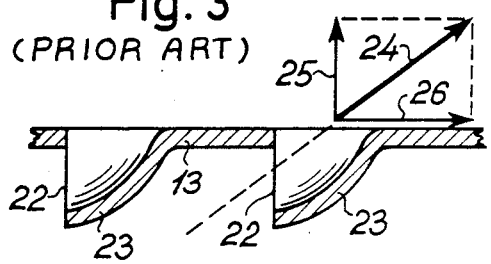
FIG. 3 shows in an enlarged scale, a fractional, sectional view of a conventional bed plate with openings of the gill type.

FIG. 3 shows a conventional bed plate having perforations or openings 22 of the so-called gill type. Such an opening may be made in a plate of sheet metal by cutting an incision or slit through the plate and by depressing the adjacent parts 23 at one side of the incision or slit. Such a bed plate with perforations or openings 22 of the gill type defines upwardly directed, inclined gas flows having a direction indicated by an arrow 24 in FIG. 3. As indicated, the gas flow 24 has a substantially vertically extending fluidizing flow component 25 and a substantially horizontally extending transporting flow component 26. When the transporting flow componetn 26 of the various perforations or openings of the gill type is directed towards the product outlet 17 any product residues are effectively removed from the bed plate 13, when the supply of product to the bed dryer has been stopped, and the damper 19 has been opened. Thus, a fluid bed dryer with a bed plate having perforations or openings of the gill type is self-cleaning or self-clearing.

It has been found, however, that in fluid bed dryers having a bed plate with perforations or openings of the gill type, the efficiency of the transporting flow components 26 is too high so that the lower layers of the fluidized product P flow towards the product outlet 17, while the upper layers of the fluidized product flow in the opposite direction towards the product inlet 16. This causes an undesired backmixing of the fluidized product P, whereby the residence time of the various particles of the fluidized product P on the bed plate can vary substantially.

Figure 2:
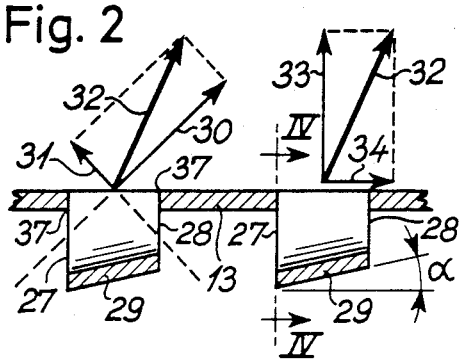
FIG. 2 shows in an enlarged scale a fractional, sectional view of an embodiment of the bed plate according to the invention.

FIG. 2 shows a bed plate 13 according to the invention and made from sheet metal. In this bed plate the openings or perforations 27 and 28 are arranged in pairs of substantially oppositely directed openings, and each pair of openings has been formed by depressing a plate portion 29 defined between a pair of spaced, parallel slits cut in the sheet metal. The ridge of the depressed portion 29 may define an acute angle $\alpha$ with the plane of the plate as indicated in FIG. 2, so that the area of each of the openings 27 exceeds that of each of the openings 28. Consequently, the amount of drying gas or air flowing through the openings 27 (illustrated by an arrow 30 in FIG. 2) exceeds the amount of air flowing through the openings 28 (illustrated by an arrow 31 in FIG. 2). The flow of drying gas or air 32 resulting from the gas flows 30 and 31 through each pairs of openings 27 and 28 is also illustrated in FIG. 2. This resulting air flow 32 has a fluidizing flow component 33 and a product transporting flow component 34 directed along the upper surface of the bed plate 13. It is understood that by varying the relationship between the areas of each pair of openings 27 and 28 it is possible to obtain a desired relationship between the fluidizing gas flow component 33 and the product transporting flow component 34, whereby the latter may be chosen so as to avoid undesired backmixing of the fluidized product P.

Figures 5, 6:
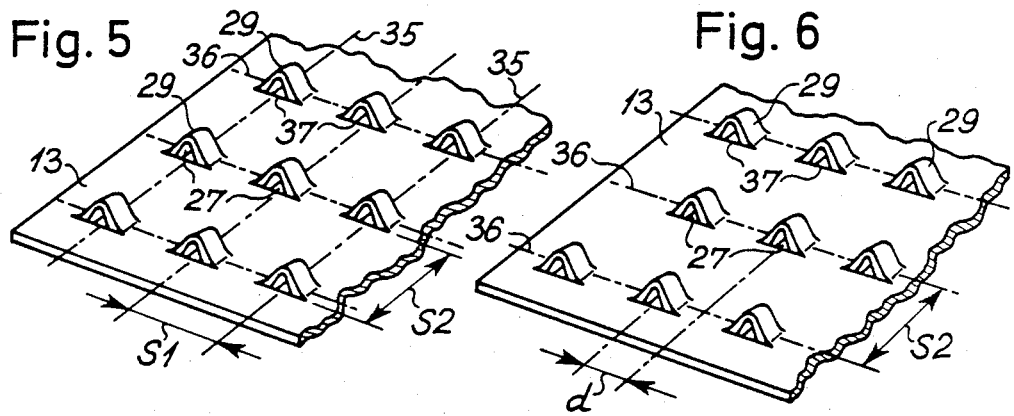

The depressed portions 29 are preferably uniformly distributed over the bed plate 13 and may be arranged in any desired pattern. Thus, as shown in FIG. 5, the depressions 29 may be arranged in parallel, mutually spaced rows 35 and 36 extending at right angles to each other. The spacing S1 of the parallel rows 35 and the spacing S2 of the parallel rows 36 may be substantially the same so that the depressed portions 29 substantially define squares.

In the bed plate 13 shown in FIG. 6 the depressed portions 29 are also arranged in parallel, mutually spaced rows 36. However, the depressed portions in each row 36 are offset in relation to the depressed portions 29 in an adjacent row. The mutual spacing of the depressed portions 29 in each of the rows 36 may, for example, be the same as the spacing S2 of the parallel rows, the distance d between the flow axes of two consecutive depressions 29 in two adjacent rows may then substantially be $\frac{1}{2} \times S2$. In the embodiments shown in FIGS. 2, 4, 5, and 6 each of the depressed portions 29 is defined between a pair of substantially parallel, spaced incisions or slits 37 formed in the sheet metal from which the bed plate 13 is made. The resulting gas flow 32 is dependent not only on the pressure difference over the bed plate, but also on the total area of each pair of openings or perforations 27 and 28. The relationship between the fluidizing flow component 33 and the transporting flow component 34 may be varied by varying the angle $\alpha$. When $\alpha = 0$, the areas of the openings 27 and 28 will be the same, and the transporting flow component will then be zero.

Figure 7:
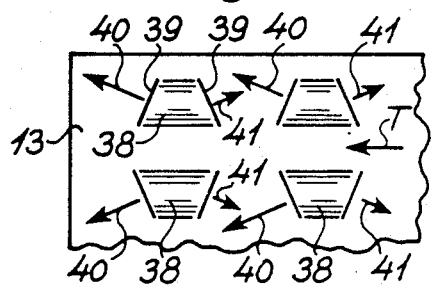
FIGS. 7 and 8 are plan views showing fractions of third and fourth embodiments, respectively, of the bed plate according to the invention.

In the embodiment shown in FIG. 7 depressed plate portions 38 are defined between pairs of incisions or slits 39 defining an acute angle therebetween. In this case, the gas flows 40 and 41 through each pair of oppositely arranged perforations or openings define an obtuse angle therebetween. In FIG. 7 the depressed plate portions 38 in each row of portions are symmetrically arranged in relation to an adjacent row of depressed portions 38. It is understood that the gas flows 40 and 41 from the various depressed portions 38 result in fluidizing flow components and transporting flow components of which the latter tend to move the fluidized product in a direction indicated by arrow T in FIG. 7.

Figure 8:
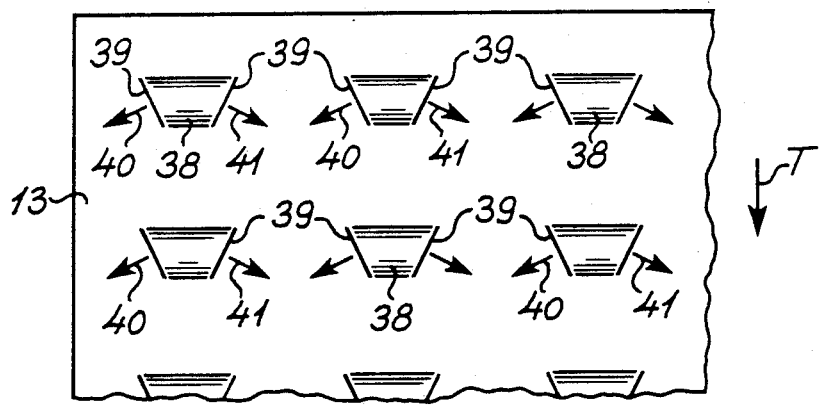

FIG. 8 also shows an embodiment in which the depressed plate portions 38 are defined between pairs of incisions or slits 39 defining an acute angle therebetween so that the gas flows 40 and 41 through each pair of openings define an obtuse angle therebetween. In FIG. 8, however, the depressions 38, which are arranged in rectilinear rows, are uniformly orientated, and the openings in each pair are uniformly sized so that the gas flows 40 and 41 through each pair of openings are also uniform. The gas flows 40 and 41 from the various depressed portions 38 of the bed plate shown in FIG. 8 result in transporting flow components tending to move the fluidized product in a direction indicated by the arrow T in FIG. 8.

Figure 4:
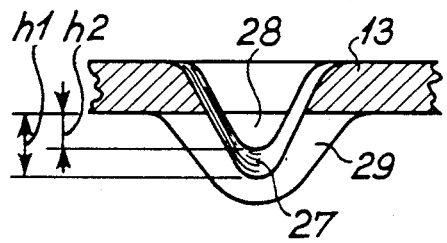
FIG. 4 is a fractional and sectional view along the line IV—IV in FIG. 2, FIGS. 5 and 6 are perspective views of a fraction of two different embodiments of the bed plate according to the invention.

FIG. 4 shows the differently sized opposed openings 27 and 28 defined by each depression 29. In FIG. 4 the height of the opening 27 at right angles to the bed plate 13 is shown as h1, and the height of the smaller opening 28 is designated h2. It is understood that the relationship between the heights h1 and h2 is dependent on the angle α (FIG. 2), so that h1=h2, when α=0. The incisions or slits 37 and 39 and the depressed plate portions 29 and 38 defined therebetween may, for example, be made by means of suitable punching tools of a type similar to those conventionally used for making a known bed plate as that shown in FIG. 3.

Figure 9:
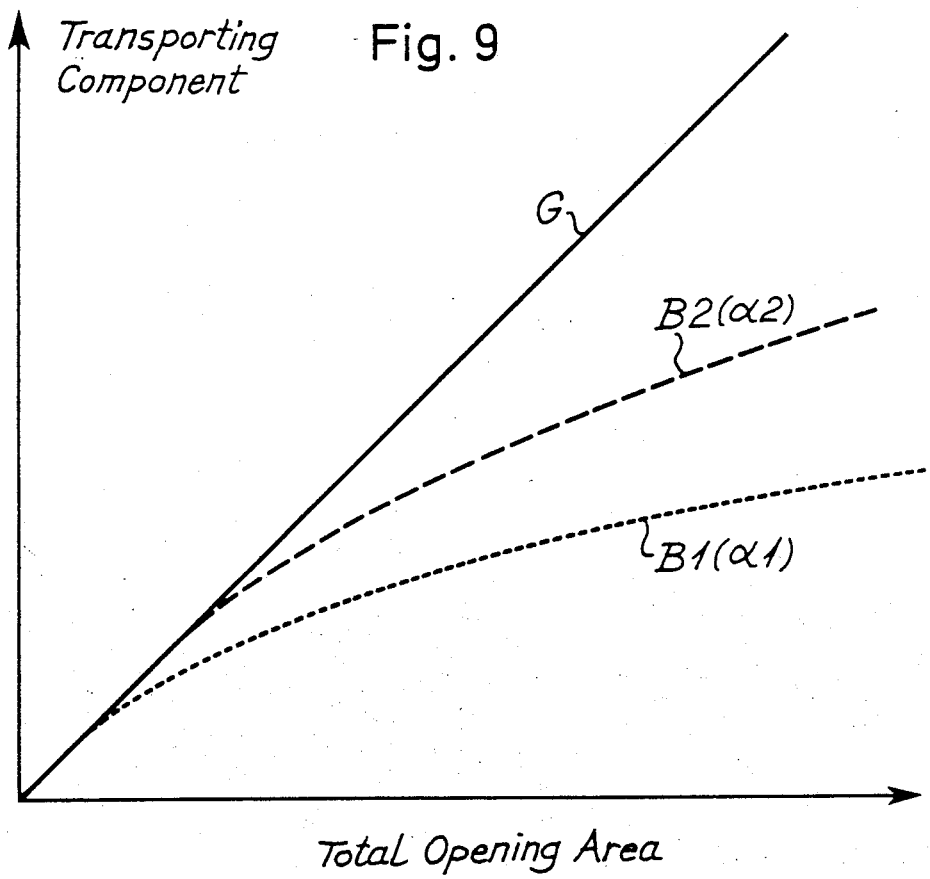
FIG. 9 is a graphic representation of the relationship between opening area and transporting flow component for various types of bed plates.

FIG. 9 are graphs illustrating schematically how the transporting flow components generated by depressed plate portions 23 and 29 increase with increasing total area of the opening or openings defined in each depression when a predetermined pressure drop is maintained across the bed plate. The graphs are valid for bed plates which are normally used for fluidized bed dryers. For larger total opening areas the graphs may be different. The graph G illustrates the relationship between the transporting flow component and the effective area of the opening 22 of a depressed plate portion 23 in a conventional bed plate as that shown in FIG. 3 of the drawings, while the graphs B1 and B2 illustrate the relationship between the transporting flow component defined by a depressed plate portion 29 and the total effective area of the openings 27 and 28 of such depressed portion in a bed plate of the type shown in FIGS. 2, 5, and 6. The graphs B1 and B2 relate to depressed portions 29, where the values of the angle α (FIG. 2) is α1 and α2, respectively, and where α1<α2. From FIG. 9 it is apparent that the transporting flow component obtained by a gill plate of the conventional type (graph G) increases substantially proportional to the increasing total opening area. As the superficial velocity (as defined below) is substantially proportional to the total opening area, the transporting flow component will increase substantially proportional to the increase of the superficial velocity. This means that when a conventional gill plate is used the transporting flow component cannot be chosen freely, when a certain superficial velocity is desired. Furthermore, FIG. 9 shows that the transporting component of a bed plate according to the invention (B1 and B2) increases less than proportional to the increase of the total opening area. It is also apparent that the increase of the transporting flow component in relation to the increase of the total area may be reduced by reducing the angle α (FIG. 2). Consequently, in a bed plate according to the invention a desired transporting component at a certain superficial velocity may be obtained by choosing suitable dimensions (h1, h2 and α) of the depressed portion 29. If α is reduced to zero there will be no transporting component and the graph will coincide with the abscissa axis.

EXAMPLE

Bed plates were made from sheet metal with a thickness of 1 mm and made from stainless steel. A plurality of uniformly distributed perforations or openings arranged in a pattern as that shown in FIG. 5 were formed in the sheet metal in accordance with the present invention by using a well known punching technique. After the punching process the plates were shot blasted with glas beads. The spacing S1 and S2 of the rows of depressed plate portions 29 were S1=16 mm, and S2=18 mm, respectively, whereby the number of depressions was 3,472 per m². In the various samples made the height h1 and h2 (FIG. 4) and the angle α (FIG. 2) as well as the length of the incisions or slits 37 (FIG. 5) were chosen as stated in the following table

TABLE

| Plate sample No. | 1 | 2 | 3 | 4 |
|---|---|---|---|---|
| Depression height, front edge h1 mm | 1.48 | 2.00 | 1.38 | 1.88 |
| Depression height, rear edge h2 mm | 0.68 | 1.20 | 1.00 | 1.52 |
| Incision length, front edge mm | 3.00 | 3.70 | 3.44 | 4.05 |
| Incision length, rear edge mm | 2.80 | 3.70 | 3.36 | 4.05 |
| Depression angle α | 9° | 9° | 4° | 4° |
| Front opening area A mm² | 3.10 | 6.54 | 2.73 | 5.61 |
| Rear opening area a mm² | 1.21 | 3.12 | 1.61 | 4.13 |
| Total opening area A + a mm² | 4.31 | 9.66 | 4.34 | 9.74 |
| Superficial velocity in m/sec at 100 mm water column and 20° C. | 0.38 | 0.71 | 0.38 | 0.72 |
| Transporting component indicating measure A − a mm² | 1.89 | 3.42 | 1.12 | 1.53 |
| Percentage increase of total area | | 124 | | 124 |
| Percentage increase of transporting component | | 80 | | 53 |

In the table the total opening area A+a and the difference A-a between the opening areas as well as the superficial velocity at a pressure difference of 100 mm water column across the bed plate and at 20° C., are stated for the same plate samples 1–4. Table also states the calculated percentage increase of the total opening area when changing from sample 1 to sample 2 and from sample 3 to sample 4, respectively. The difference A-a between the opening areas of each depression may be taken as a measure of the transporting flow component. On this basis the percentage increase of the transporting flow component when changing from sample 1 to sample 2, and from sample 3 to sample 4, respectively, has been calculated.

From the above table it is apparent that when the depression height is increased without changing the angle α in order to increase the superficial velocity, the transporting flow component does not increase proportionally. Thus, for example, when the total opening area and consequently also the superficial velocity is increased by 124%, the transporting flow component will be increased by only 80%, when the depression angle α is 9°, and only by 53%, when the depression angle is 4°.

In the present specification "superficial velocity" should be understood as the average velocity of the fluidizing gas flow calculated for the total area of the bed plate in question.

In a fluid bed dryer the bed plate 13 according to the invention is normally arranged with the depressed portions 29 and 38 at the bottom side thereof as shown in FIG. 1. For some applications the depressed portions may alternatively be formed at the upper side of the bed plate. However, it is noted that for the purpose of illustration the depressed portions 29 are shown in an exaggerated size in this figure of the drawing.

As indicated above, the transporting component and the superficial velocity of the bed plate may be changed by changing the depression angle α. The depression angle of an existing bed plate may be reduced by passing the bed plate between a pair of spaced rollers, whereby the depressed plate portions 29 are somewhat compressed. Thus, it is possible to adjust the depression angle of various bed plates to different values, even when the bed plates have been made by means of the same punching tool.

It should be understood that various amendments and modifications of the bed plate descirbed with reference to the drawings could be made within the scope of the invention. As an example, the incisions 37 and 39 may be convexly or concavely curved or may be elongated openings formed by cutting material from the sheet metal from which the bed plate is formed.

I claim:

1. A fluid bed dryer comprising
   a bed plate having a plurality of gas distributing openings defined therein, the openings of the bed plate being arranged in pairs of substantially oppositely directed openings, the area of one of the openings in each pair exceeding that of the other, a depressed portion of the plate extending between the openings of each pair, and
   means for passing drying gas upwardly through the openings of the bed plate for fluidizing a particulate product supplied to the bed plate.

2. A fluid bed dryer according to claim 1 wherein each opening is defined by peripheral edges defining a plane extending substantially at right angles to the adjacent surface of the bed plate.

3. A fluid bed dryer according to claim 1, wherein the bed plate is made from sheet metal, the openings in each pair having been formed by depressing a plate portion defined between a pair of spaced slits cut in the sheet metal.

4. A fluid bed dryer according to claim 3, wherein the length of one of the slits in each pair exceeds that of the other.

5. A fluid bed dryer according to claim 3 wherein the slits of each pair define an acute angle therebetween.

6. A fluid bed dryer according to claim 3, wherein the slits of each pair are substantially parallel.

7. A fluid bed dryer according to claim 1, wherein said pairs of openings are arranged in groups each comprising at least one pair of openings, the openings of each group being shaped so as to provide gas flows forming a resulting gas flow having first and second components extending in the plane of the bed plate and at right angles to the plane of the bed plate, respectively.

8. A fluid bed dryer according to claim 7, wherein the bed plate is circular, said first flow component extending in the peripheral direction of the circular bed plate.

9. A fluid bed dryer according to claim 7, wherein the bed plate is substantially rectangular, said first flow components extending in the longitudinal direction of the rectangular bed plate.

10. A bed plate for a fluid bed dryer, said bed plate having a plurality of gas distributing openings defined therein, the openings of the bed plate being arranged in pairs of substantially oppositely directed openings, the area of one of the openings in each pair exceeding that of the other, a depressed portion of the plate extending between the openings of each pair.

11. A bed plate according to claim 10, wherein each opening is defined by peripheral edges defining a plane extending substantially at right angles to the adjacent surface of the bed plate.

12. A bed plate according to claim 10 and made from sheet metal, the openings in each pair having been formed by depressing a plate portion defined between a pair of spaced slits cut in the sheet metal.

13. A bed plate according to claim 12, wherein the length of one of the slits in each pair exceeds that of the other.

14. A bed plate according to claim 12, wherein the slits of each pair define an acute angle therebetween.

15. A bed plate according to claim 12, wherein the slits of each pair are substantially parallel.

16. A bed plate according to claim 10, wherein said pairs of openings are arranged in groups each comprising at least one pair of openings, the openings of each group being shaped so as to provide gas flows forming a resulting gas flow having first and second components extending in the plane of the bed plate and at right angles to the plane of the bed plate, respectively.

17. An annular or circular bed plate according to claim 16, wherein said first flow components extend in the peripheral direction of the annular or circular bed plate.

18. A substantially rectangular fluid bed dryer according to claim 16, wherein that said first flow components extend in the longitudinal direction of the rectangular bed plate.

* * * * *